United States Patent [19]

Zandveld et al.

[11] Patent Number: 4,562,534
[45] Date of Patent: Dec. 31, 1985

[54] DATA PROCESSING SYSTEM HAVING A CONTROL DEVICE FOR CONTROLLING AN INTERMEDIATE MEMORY DURING A BULK DATA TRANSPORT BETWEEN A SOURCE DEVICE AND A DESTINATION DEVICE

[75] Inventors: Frederik Zandveld; Daniël Schouten; Peter C. L. van der Vliet, all of Beekbergen, Netherlands

[73] Assignee: U.S. Philips Corporation, New York, N.Y.

[21] Appl. No.: 720,041

[22] Filed: Apr. 3, 1985

Related U.S. Application Data

[63] Continuation of Ser. No. 407,194, Aug. 11, 1982, abandoned.

[30] Foreign Application Priority Data

Aug. 21, 1981 [NL] Netherlands ................. 8103895

[51] Int. Cl.⁴ .................... G06F 3/04; G06F 13/00
[52] U.S. Cl. .................................................. 364/200
[58] Field of Search ............................ 364/200, 900

[56] References Cited

U.S. PATENT DOCUMENTS

| | | | |
|---|---|---|---|
| 3,704,453 | 11/1972 | Blackwell et al. | 364/200 |
| 3,728,693 | 4/1973 | Macker et al. | 364/200 |
| 4,065,810 | 12/1977 | Cramer et al. | 364/200 |
| 4,177,512 | 12/1979 | Moggia | 364/200 |

FOREIGN PATENT DOCUMENTS 1354155  5/1974  United Kingdom .

Primary Examiner—James D. Thomas
Assistant Examiner—David L. Clark
Attorney, Agent, or Firm—Jack E. Haken; James J. Cannon, Jr.

[57] ABSTRACT

In a data processing system a control device for an intermediate memory during a bulk data transport between two data devices. A first data device addresses a number of descriptor signals. Each descriptor signal indicates another descriptor signal, so that a sequence is formed which is cyclically coupled end-around. The descriptor signals indicate either a memory section or a branch to a remote address in the memory. The memory sections used may thus be distributed throughout the memory. Additional descriptor signals indicate, in a direct or indirect manner, a descriptor signal of the sequence for each of the two data devices. A handshake by way of signal bits is present at the level of the memory sections.

2 Claims, 6 Drawing Figures

DATA PROCESSING SYSTEM HAVING A CONTROL DEVICE FOR CONTROLLING AN INTERMEDIATE MEMORY DURING A BULK DATA TRANSPORT BETWEEN A SOURCE DEVICE AND A DESTINATION DEVICE

This is a continuation of application Ser. No. 407,194, filed Aug. 11, 1982, now abandoned.

BACKGROUND OF THE INVENTION

1. Field of the Invention

The invention relates to an improvement in a data processing system. A system of this kind comprises four categories of sub-systems, i.e. for the storage of data, for the processing of data (combination, ordering, modification), for contacting the environment, and for interconnecting the subsystems of the other three categories. The invention relates to a data processing system having a control device for the control of an intermediate memory during a bulk data transport between two data devices, i.e. from a source device to a destination device. The intermediate memory may be a specially added memory, but in many cases it forms part of the main memory of the data processing system. Viewed on the time scale of the bulk data transport, it is a random access memory consisting of solid state RAM modules. The intermediate memory may also consist of other types of memory devices. Such an intermediate memory is customarily used when discrepancies exist between the instants at which the source device presents data and the instants at which the destination can accept a quantity of data. When each of the data devices is internally synchronized, such discrepancies always occur in practice. Such discrepancies are also caused by a temporary or consistent difference between the output rate of the source device and the acceptance rate of the destination device. A bulk data transport is to be understood to mean herein a transport where the amount of data is larger or much larger than the storage space available in the intermediate memory for control of the transport.

2. Description of the Prior Art

A device of the above kind which, however, comprises a serially operating intermediate memory with its inherent drawbacks, is known from U.S. Pat. No. 4,040,027. When the intermediate memory thereof tends to overflow, the data source is stopped. This intermediate memory is organized as a first-in-first-one (FIFO) memory. Some data sources, however, cannot be stopped. Moreover, often so much data is produced that a FIFO organization is not feasible or too expensive; in that case the data must be written directly in the correct location in the intermediate memory wherefrom it is applied directly to the destination device. Moreover, each memory location must be usable several times within one transport operation, because the capacity of the intermediate memory must be small with respect to the magnitude of the bulk data transport. Finally, there is the problem that the intermediate memory represented by the main memory must often serve a variety of purposes at one single instant; in that case it is not possible to indicate in advance where available memory sections (for example, memory pages) will be situated in the intermediate memory. The source device and destination device must be capable of simultaneously accessing the intermediate memory. The integrity of the data must then be maintained, i.e. simultaneous accessing of the same manner location by the two data devices must be precluded.

SUMMARY OF THE INVENTION

It is an object of the invention to provide a data processing system with a high degree of freedom in the number and capacity of the participating memory sections, and furthermore to provide simplified and easy control of the intermediate memory. According to the invention in that the intermediate memory for this data transport has a first number of memory sections is reserved for the transport, each memory section being pointed to by a first descriptor, while a complement of first and second descriptors form an interlinked cycle. Each first descriptor signal addresses a relevant memory section of said first number of memory sections, and indicates the length thereof. Said first descriptor signal has a data chaining bit which indicates that the relevant descriptor signal is a first or a second descriptor signal, a non-branch bit which indicates that the next descriptor signal is stored in the next location of the descriptor device, an availability bit which indicates an availability condition of the indicated memory section, and a stop bit which indicates an alarm condition. Each second descriptor signal contains a jump address for a further descriptor signal, a data chaining bit, and a branch bit which indicates that the next descriptor signal is indicated by the jump address. Thus the set of first descriptor signals and at least one second descriptor signal constitute a chain by successive referencing, thereby forming a cyclically activatable sequence of memory sections. The source device as well as the destination device include means for accessing the descriptor device and the descriptor signals stored therein in order to have a memory section thus indicated filled by the source device or vacated by the destination device, as the case may be. At least one of said data devices has second means for setting the stop bit of a descriptor signal to be addressed by the other data device to the alarm state.

The invention realizes that the two data devices may both access the memory sections in sequence while a handshake can be achieved at the level of the memory sections. Therefore, no interference between two data devices should occur, as when they would access the same memory section. It may happen that the source device wishes to fill a memory section while the destination device is still engaged in vacating the same memory section, or vice versa. Conflicts of this kind are resolved by meanss of the availability bit.

Further descriptors may be reserved for either source device or destination device and point of an additional memory section while being linked to the cycle of first and second descriptors. An additional memory section can thus be reserved for the first data device; special information can be stored therein, for example information supplied by a central processor or a programmer. In the case of a magnetic disc memory, such special information may be signals such as "read", "write", and the cylinder number. Similarly, an additional memory section may be assigned to the second data device. The third descriptor signal may be followed directly by one of the first or second descriptor signals, or by a descriptor signal which controls a branch operation to a first or second descriptor signal. The additional memory section is always available, because it can be accessed by one data device only.

The control device can also be used when one of the data devices is not ready for independent processing of the descriptor signals. Under the control of an interrupt, such processing can be realized by a central processor unit by means of software operations.

In this way the control of the intermediate memory may be done quite simply in that the descriptor signals are stored in a simple, generally accessible memory. In the case of an intermediate memory represented by part of the main store, the descriptor signals would also be stored in main store. The evaluation of the several control and signalling bits could be executed by elementary microprogram steps in a simple manner.

BRIEF DESCRIPTION OF THE FIGURES

The invention will be described with reference to some Figures.

DESCRIPTION OF A PREFERRED EMBODIMENT

Figure 1:
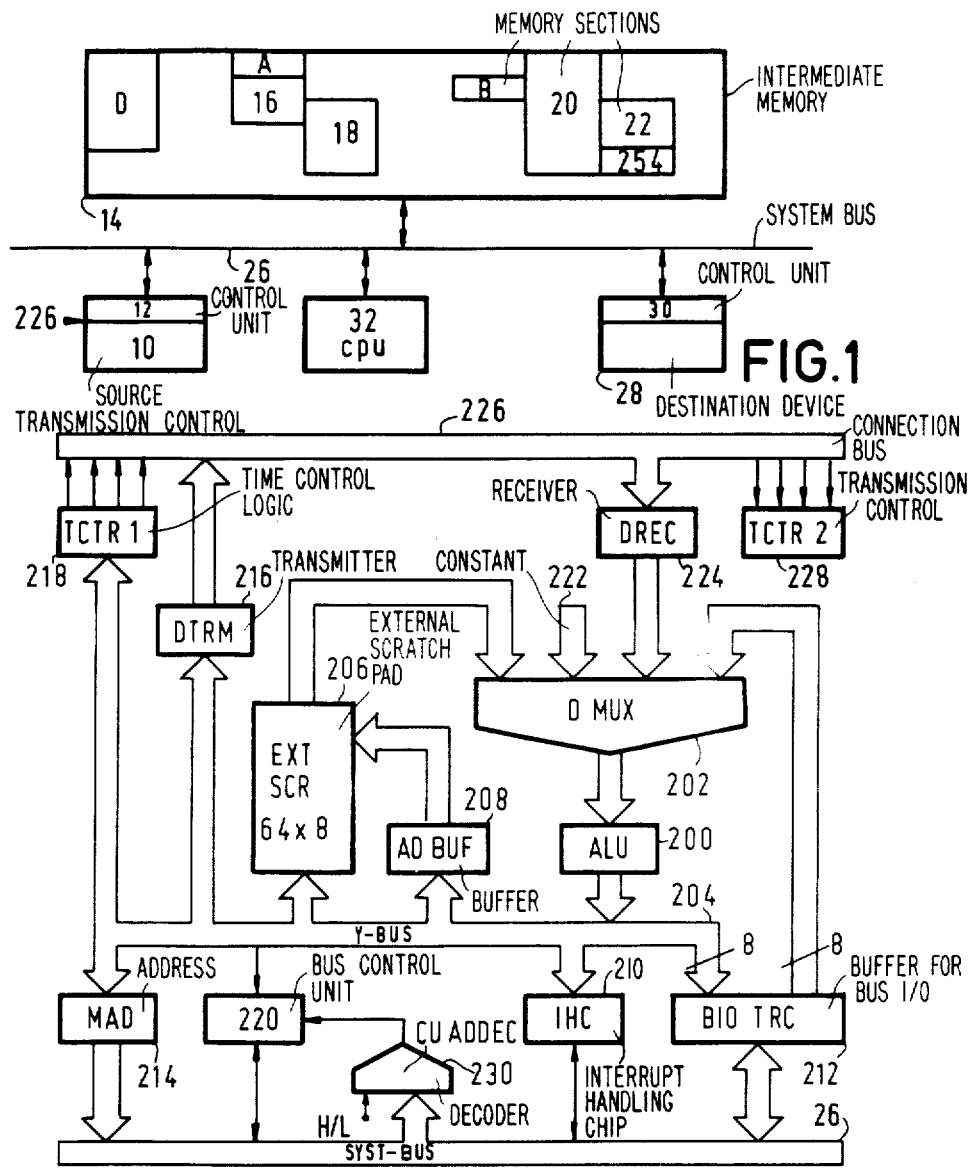
FIG. 1 shows, diagrammatically, a computer system in which the invention to be described hereinafter is implemented.

FIG. 1 shows, diagrammatically a computer system in which the invention to be described hereinafter is implemented. Block 10 represents a source device. This is, for example, a large measuring system wherefrom a large number of digital measurement signals are derived by means of transducers which are interrogated cyclically. In another embodiment a disc memory is concerned whose entire data content must be transferred to another storage medium. The supply rate of the data may be in the range from 100 to 1000 kilobaud, but this is only an example. The amount of data to be transported may be known in advance, but may also be virtually unlimited. The source device in this system operates as a peripheral apparatus with an associated control unit 12 which may be connected to the system bus 26 in a conventional manner. The data is applied to the intermediate memory 14 via the bus. In the present embodiment, the intermediate memory is formed by the main memory of the data processing system. Eight memory sections A, B, D, 16, 18, 20, 22, 254 are available for the relevant bulk data transport. The remainder of the memory is available for other tasks. As is indicated, the lengths of the memory sections need not all be the same. Via the bus 26, the data can be output to a destination device 28 which is connected to the bus via a control unit 30. The destination device is, for example, a magnetic tape device of the "streamer" type (make Archive Corporation, Costa Mesa, Calif., USA, described, for example, in Computer Design, April 1982, pp. 91-99, 103-112) whose data acceptance rate is high enough to satisfy the requirements imposed by the source device. Other examples in this respect are a magnetic disc memory, or a filing memory incorporating a digital optical record (DOR). In the case of a magnetic tape device, the tape should not be stopped each time a data section has been vacated, because in that case a comparatively large amount of time would be lost each time and the effective transport speed would be substantially reduced. On the other hand, the tape transport should not continue when no information may be supplied, because in that case the storage medium would not be used effectively. Similar considerations hold good for the other examples of destination devices. Generally, each time the source device has filled a memory section, the next memory section to be filled by the source device must be known immediately. Moreover, each time the destination device has vacated a data section, the next data section to be vacated by the destination device must be known immediately. Thus, for the source device 10 and the destination device 28 the intermediate memory 14 acts as if it has a capacity which is much larger than its actual capacity. In the case of a magnetic tape device as described, it may occur, of course, that over a prolonged period of time more data is extracted on average by the destination device than is supplied by the source device. In that case the magnetic tape device will be temporarily stopped when, after the vacating of a data section, there is no completely full data section available to be vacated. However, all customary magnetic tape devices comprise a mechanism to achieve this, so that for the sake of brevity the relevant steps will not be described herein. The tape device may act as a source device and another peripheral apparatus as a destination device in a similar manner.

Block 32 represents the processor unit which is also bidirectionally connected to the bus 26. For the chaining of the memory sections of the memory 14 there is provided a control device which is formed by relevant sections of the processor 32 and the control units 12 and 30, together with the memory section D which is reserved for descriptor signals in order to form the chain of memory sections. This memory section embodies the descriptor device and, if programmed accordingly, it outputs the descriptor signals when activated. It may be permanently or variably programmed. In the latter case, programming is realized by the processor unit. A cyclically addressable sequence is formed from the available number of memory sections. When a bulk data transport is to be performed, the processor unit 32 applies starting instructions to the source device 10 (12) and the destination device 28 (30) via the system bus 26. The starting instructions contain data which indicates for each of the two devices (source, destination) where the first relevant descriptor signals for the relevant data device are stored in the memory 14. It is conventional per se to effectuate a data transport between two data devices by means of descriptor signals; therefore, it will be explained only in as far as modifications in accordance with the invention influence a bulk data transport of the kind described. This influence concerns the cooperation between the control units (10, 30) of the data devices and the composition of the descriptor signals in the section D, because the bulk data transport is controlled thereby.

Figure 2:
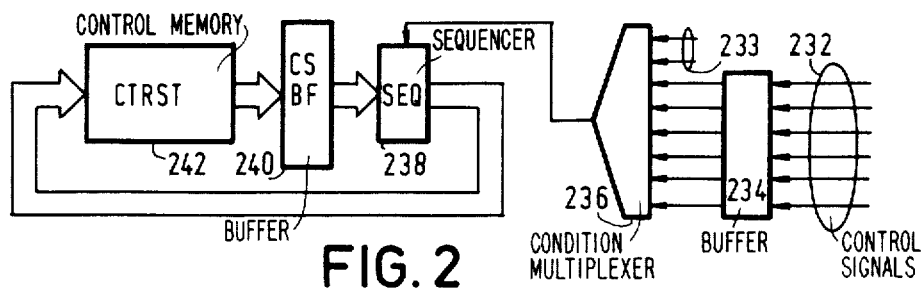
FIG. 2 is a block diagram of a control unit of a data processing device.

FIG. 2 is a block diagram of the control unit (10, 30) of a data processing device. The core of this unit is formed by the arithmetic and logic unit 200 which is controlled by a microprogram; this unit is a module pair of the type AM 2901, make: Advanced Micro Devices, 901, Thompson Place, Sunnyvale, Calif., USA. It is described in the book "The AM 2900 Family Data Book", Copyright of the manufacturer, 1976. Data input is realized via a multiplexer 202. Data output is realized via an internal Y-bus 204. An external scratchpad memory 206 which has a capacity of 64 bytes of 8 bits and which is addressed by an address buffer 208 is provided.

The Y-bus 204 is also connected to a module 210 which processes interrupt signals, to a bidirectional buffer 212, to a memory address buffer 214, to a data transmitter 216, to a time control logic system 218, and to block 220. The last element deals with the access operations to the system bus 26 (notably as regards enable signals and time marking signals). The inputs of the multiplexer 202 are connected to the scratchpad memory 206, to an input 222 for a constant from the control memory, to a data receiver 224, and to a BUS-I/O element 212. As indicated, there are three bus lines: the internal Y-bus 204, the system bus 26 on which addresses and control signals are transported, and the connection bus 226. The actual peripheral apparatus (10, 28 in FIG. 1) is connected thereto. For a tape device data signals which are processed by the elements 216 and 224, and also control signals such as read/write control signals, status signals and synchronization signals are transported thereon. These control signals are processed by the elements 218 and 228. The element 228 extracts control and time marking signals from the connection bus 226, thus forming a counterpart to the block 218. Element 230 is an address decoder (with an additional presettable H/L input signal) for activating the block element 220. Block 220 symbolizes a control unit for access operations to the system bus. This unit is connected to the control lines of the bus 26 for receiving synchronization and enable signals and for transmitting similar signals. Further control signals are received from the Y-bus. Block 210 symbolizes the interrupt processing circuit. Under the control of an interrupt signal it generates an address for the scratchpad memory. On the other hand, under the control of a data signal on the Y-bus it can also produce an interrupt request signal on the system bus 26.

The lower part of FIG. 2 shows the components which provide microprogram control. Control signals from different parts of the control unit arrive on inputs 232 and 233. These control signals originate from different points within the control unit, notably from the ALU 200 as a result of tests performed therein, for example on the bits of the control octade to be discussed hereinafter. Further condition signals are formed by the synchronization and control unit TCTR2 (228). These condition signals are applied to the condition multiplexer 236 possibly after buffering in the buffer 234. Conducted data is applied to sequencer 238. The latter is included, together with a control memory 242 (1k40) and an associated buffer 240, in a circuit which is coupled end-around. Control signals for the further parts of the circuit shown are derived from the block elements 228 (conditions) and 240 (microinstructions). A set-up as shown is also suitable for performing conventional data transport (without using a cycle of memory sections). The signals required for constituting such a cycle of memory sections are analyzed or produced in the three blocks 238, 200 and 236.

Figure 3:
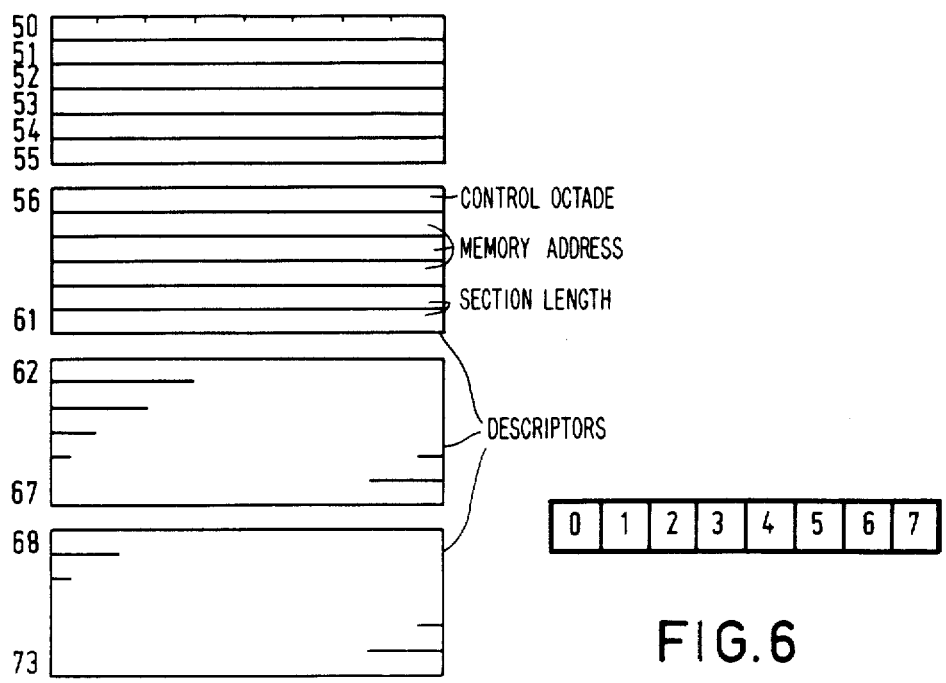
FIG. 3 is a diagram of the data content of a descriptor device.

FIG. 3 is a diagram of the data content of a descriptor device. This device is located in the memory section D of the memory 14 (FIG. 1). This need not necessarily be the first section; usually it will be situated in a part of the memory which is reserved for a variety of (more or less) generally usable control data. The memory words in this embodiment contain 8 bits; the system bus has a width of 16 bits. The set of descriptor signals is also referred to as "the descriptor". The first memory lines (words, for example, 12 octades) are reserved for general information such as:

the number of the relevant peripheral apparatus;
a code for a control mode (for example, read or write);
an indicator for the largest permissible amount of data in the bulk data transport (for example, how much data can be accommodated on the magnetic tape).

The data described is thus present on the lines 50-55 and concerns the second data device. Each descriptor signal comprises six 8-bit words. Lines 56-61 thus contain the first descriptor signal. The line 56 contains a control octade to be described hereinafter. The lines 57, 58, 59 contain a memory address. When this descriptor signal indicates a memory section, this memory address will be the address of the memory section which may be present in the memory in an arbitrary position. Alternatively, this address indicates the location where the next descriptor signal is to be fetched. These addresses thus always contain 24 bits. Lines 60, 61 are reserved for the storage of the (partial) length of the associated memory section. If no memory section is associated with this descriptor signal, the content of the relevant octades is without significance. Similarly, every six subsequent octades may contain a further descriptor signal. All descriptor signals thus occupy the same, modular space in the memory. In this example, 24 octades are reserved for the relevant peripheral apparatus. Similarly, the octades 80-91 are reserved for the first data device, i.e. six octades for the general information and six octades for only one descriptor signal in this example. It will appear from the description of the practical embodiment with reference to FIG. 4 that usually more descriptor signals are used than the small number of FIG. 3.

Figure 4:
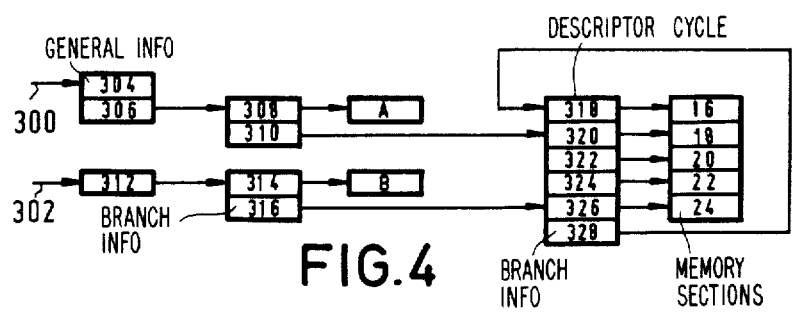
FIG. 4 illustrates, diagrammatically, the cooperation between the descriptor device and the memory sections.

FIG. 4 illustrates the cooperation between the descriptor device and the memory sections. When a bulk data transport is performed initiation takes place by the central processor (32 in FIG. 1). The central processor addresses the source device and the destination device by producing the relevant device addresses on the address section of the system bus (the single line 26 consists of a 16-bit data bus, a 24-bit address bus and the control bus). Furthermore, each participating data device receives a memory address which indicates the first octade of the associated descriptor; an arrow 300 in FIG. 4 refers from the first data device to the associated descriptor. Block 304 indicates the associated general information (lines 50-55 in FIG. 3). The directly subsequent addresses contain branch information (to block 308). The address of the block 308 need not directly succeed that of the block 306. The descriptor signal in the block 308 indicates the memory section A in FIG. 1 which contains the specific information which is valid for the relevant data transport. This information need not always be valid for all other data transports in which the relevant data device participates. It may be, for example, the name or the number of the data block to be transported. The next descriptor signal 310 controls a branch to descriptor signal 320. This signal addresses the memory section 16 (see FIG. 1). The subsequent descriptor signals 322, 324, 326 address the memory sections 20, 22, 254, respectively. The subsequent descriptor signal controls a branch to descriptor signal 318. The latter addresses memory section 16 and the loop is closed by the next descriptor signal 320. FIG. 1 indicates that all descriptor signals are present in the section D; however, they may be present in an arbitrary location in the memory and, moreover, the section D may also consist of several distributed subsections.

Similarly, arrow 302 refers from the second data device to block 312. This block contains branch data to block 314. The descriptor signal in block 314 indicates the section B in FIG. 1; in this case the function of block B corresponds to the blocks A (memory section) and 304 (part of descriptor) for the first data device. On the other hand, a specific counterpart to block 304 may also be present. The next descriptor signal 316 controls a branch to the descriptor signal 326. The latter forms part of the cycle 318-320-322-324-326-328. Various modifications can be made, for example:
- the cycle may comprise a different number of descriptor signals
- the cycle may comprise several branch operations
- there may also be other descriptor signals which control a branch operation to the cycle, or
- the cycle may be entered directly (without branching)
- the initial structure (blocks 304-310, 312-316) may be more complex or, alternatively, simpler.

The organization of the bulk data transport utilizes five memory sections 16-24 in FIG. 1. If this number equals at least two, read and write operations can in principle be performed simultaneously, so that the effective transport speed is substantially increased.

Figure 5:
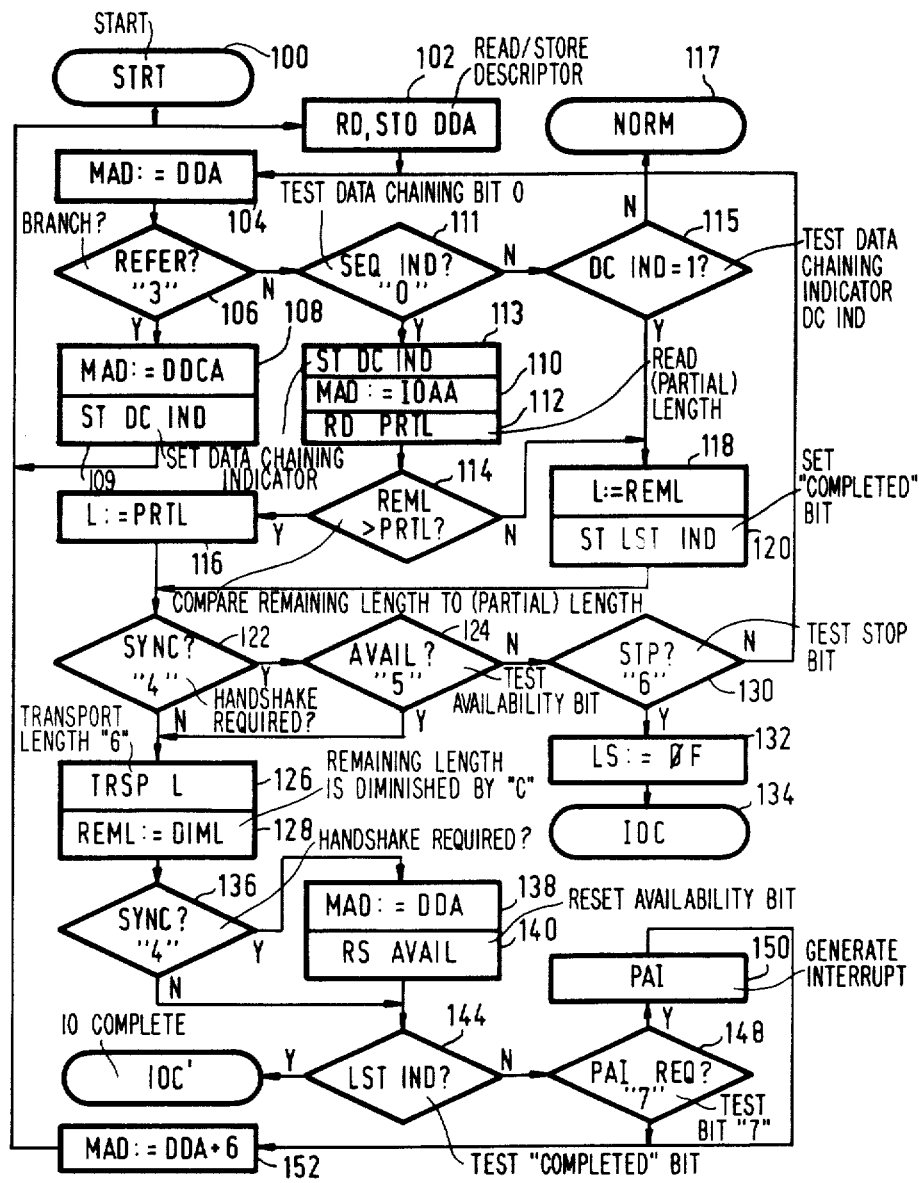
FIG. 5 is a flowchart of the relevant part of the operation of a control unit of a data device.

FIG. 5 is a flowchart of the relevant part of the operation of the control unit (12, 30) of a data device participating in the bulk data transport. In a preferred embodiment, both bath devices are suitable for the successive addressing of a sequence of memory sections, but the control device is also suitable for controlling the situation in which only one of the data devices is capable of doing so. The arrows 300, 302 and the associated control shown in FIG. 4 are not elaborated as they relate to conventional operations. The organization of FIG. 5 has been designed for use when a magnetic tape device (streamer) as a destination device imposes the strictest limitations to the transport. In other embodiments, modifications of the flowchart may be advantageous. Block 100 indicates the start of the process; for example, the lines 50-55 (FIG. 3) are then read and any decisions are made on the basis of the content of these lines. These steps, however, are not particularly relevant to the present invention. Block 102 indicates that the next six octades of descriptor signals are fetched successively from the memory 14 in order to be temporarily stored in the scratch pad memory (206). In block 104, the memory address in MAD buffer 214 is made equal to the address portion of the descriptor signals ($2^{nd}$ to $4^{th}$ octade) and the control octade is transferred from the scratchpad memory to the arithmetic and logic unit for further testing. In block 106, bit "3" of the control octade is tested; this bit indicates whether a branch operation is concerned. If so (Y), the address in the MAD buffer acts directly as a proceed memory address (DDCA); this is effected in block 108. In block 109, a data chaining bit (bit DC-IND) is set to "1". This bit indicates that a chain of descriptor signals is concerned. Subsequently, the control returns to the block 102 in order to treat the first six octades present as from the new memory address.

If no branch is detected in block 106(N), the data chaining bit (bit "0") of the control octade is tested in block 111. If it is a "1", it indicates that the relevant descriptor signal is followed by further descriptor signals (the bit DC-IND does not form part of the control octade). In that case the data chaining bit is first set to "1" in block 113, before the control enters block 110. If the data chaining bit is "0", either the descriptor signal does not form part of a sequence of descriptor signals or the relevant descriptor signal is the last one of a chain of descriptor signals. Generally, neither of the two cases will concern a bulk data transport. In block 115 it is tested whether the data chaining bit (DC IND) is "1". It may have been set to "1" in block 109 or block 113. If this is not the case (N), the control returns to block 117 and the memory section thus addressed is filled or vacated in a conventional manner. Subsequently, the relevant data device indicates a "free" situation, so that the central processor unit may attempt to start the next data transport to or from this data device. If the first test in block 115 is positive (Y), the control proceeds to block 118.

After completion of said block 113, it is indicated in block 110 that the address in the MAD buffer is ready to address a memory section in order to effect a data transport thereto or therefrom (MAD:=IOAA). In block 112 the last two octades of the descriptor signals are read from the scratchpad memory (RD PRTL) and tested in the arithmetic and logic unit 200; these two octades indicate the length of the relevant memory section. In block 114 it is tested whether the amount of data still to be transported (REML) exceeds the length of the relevant memory section (PRTL). The amount REML is also stored in the scratchpad memory 206 at the beginning of the operation, when the very first twelve octades of the descriptor information of the relevant data transport are read. If the relevant memory section is too small (Y), a data "L" is stored in the scratchpad memory in order to indicate that the maximum (PRTL) data volume must be stored in the memory section (block 116). In the opposite case (N), the information "L" is made equal in block 118 to the data volume yet to be transported. Furthermore, an indicator bit is set in block 120 to indicate that the data section to be treated next is the last one of the sequence.

In block 122, the content of bit "4" of the control octade is used to detect whether an organization with a handshake at the level of the memory section is required (SNC?). This is the case if the destination device as well as the source device must be able to operate in the relevant memory section. If this is not the case (N), this information (bit "4") acts as an "always available" bit and the data transport may take place immediately. In FIG. 4 this is the case for the memory sections "A" and "B". However, if a handshake must be realized at the level of the memory section (Y), this bit acts as a "limited availability" bit and it is tested in block 124 whether the relevant memory section is available to be filled (i.e. whether it is empty) or available to be vacated (i.e. whether it is full). The memory section may not (yet) be available because:
- the other data device has not yet completed the filling or vacating of the memory section,
- the other data device has not even started the filling or vacating of the relevant memory section.

If the availability bit has the appropriate state (Y), (i.e. this is bit "5" of the control octade) the control proceeds to block 126. If this availability condition does not exist (N), it is tested in block 130 whether an alarm stop is indicated by bit "6" of the control octade. If this is not so, the control unit of the relevant data device returns to block 104; blocks 104, 106, 110, 112, 114 (116/118, 120), 122, 124, 130 form a waiting loop for as long as the availability condition does not arise. The alarm condition is indicated when the process no longer progresses, for example in the case of a broken magnetic tape; this is signalled to the central processor unit by the relevant data device by way of an interrupt signal. The processor unit can always address all data devices and in this case it will invert the alarm bits of the descriptor device in order to indicate the alarm stop. Preferably, this takes place only for the control octades which produce a negative result (N) for the other data device (which still functions) in block 124; the correctly operating data device can thus continue for as long as possible. If the test in block 130 is positive, other steps must be taken. Such steps may concern, for example, a retry for the memory section, for example with software control. The fault may also be eliminated by human intervention (substitution of another tape unit). When the alarm stop is detected (Y), the logic status octade LS is set to "00001111" (HEX ∅F) by the central processor unit in block 132, via the system bus. Finally, an interrupt signal which indicates completion of the process is generated in block 134. The formation of interrupt signals is a conventional procedure in computer systems.

If no handshake is required (block 122) or if the availability of the relevant memory section is detected in block 124, a data volume having the length L is transported in block 126. This can be performed by transporting one or two data octades at a time from or to the relevant memory section in which the quantity L is decremented by one or two units, respectively. When the quantity L becomes equal to "0", the transport has been completed. According to an alternate possibility, here the number of octades already transported is represented by an auxiliary variable. When it becomes equal to L, the transport has been completed. It is to be noted that one and the same data device may form a source device as well as a destination device. In that case the availability bit must be tested for equality with a value which is adapted to the actual situation.

In block 128 the length of the volume of data yet to be transported is reduced by L. In block 136 it is tested again whether a handshake at the level of the memory section is required. Therefore, this block is identical to block 122. If such a handshake is indeed required (Y), first the memory address is again made equal in block 138 to the starting address of the relevant descriptor signal. Therefore, this block is identical to block 104. Subsequently, in block 140 the availability bit is set to the state "available" for the other data device and is rewritten to the memory (14). Subsequently, the state of the bit which has possibly been inverted in block 120 is tested in block 144. If it indicates that the relevant question is positively answered, an interrupt signal (IOC') which indicates the completion of the data transport is formed in block 146. This signal has a different character from the signal formed in block 134, because the logic status octade LS now obtains the value "00000000" (HEX ∅∅). At the same time the bit DC IND is reset to zero. The main program may then be continued by the central processor unit.

If the reply to the question in block 144 was negative (N), a special bit can be tested in block 148. This is a permanent bit ("7") of the control octade. The value "1" indicates that the other data device is not prepared to carry out the control in accordance with FIG. 5. When this value of the special bit is detected, an interrupt signal is generated on the system bus. For the other data device the necessary steps are then performed under software control; this device notably receives the address of the memory section just completed in order to treat this section. It may be found that the data flow thus remains sufficient if the interruption of the operation of the other data device is not excessively long.

When the answer to the question posed in block 148 is negative (N), or block 150 has been completed, the memory address indicated by DDA is incremented by "6" in block 152. The control octade of the next descriptor signal is thus addressed. The control subsequently returns to block 102.

Figure 6:
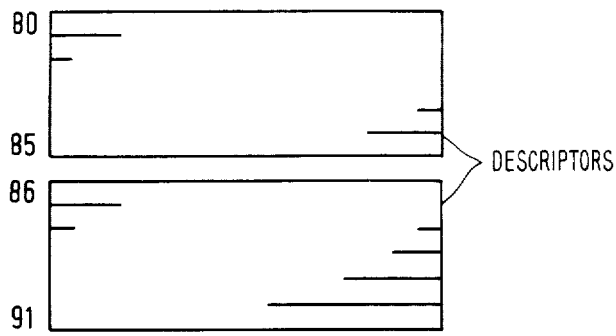
FIG. 6 shows a control octade.

FIG. 6 summarizingly shows the control octade. Bit "0" is the data chaining bit. Bit "1" is the "skip write" bit which is irrelevant to the invention. Bit "2" indicates "direct/indirect" and is irrelevant to the invention. Bit "3" is the "branch/non-branch" bit. Bit "4" is the "always available/limited available" bit. Bit "5" is the "availability" bit. Bit "6" is the "alarm" bit. Bit "7" is the "special" bit.

What is claimed is:

1. A data processing system having a control device for controlling a bulk data transport from a source device (10) to a destination device (28) via an intermediate memory (14), wherein the intermediate memory comprises a plurality of cyclically linked memory sections assigned to the transport as representing a buffer of quasi-infinite-length, wherein the control device comprises a descriptor device having a plurality of first descriptors (318-326) and at least one second descriptor (328), a set of first and second descriptors being connected in a chain having a single loop, each first descriptor containing:

a data chaining bit signalling that the descriptor is part of said chain;

a memory address;

a non-branch bit signalling that the memory address indicates an associated linked memory section, and signalling that the next descriptor is located in the next location of the descriptor device;

an availability bit which in a first state signals availability exclusively to the source device and in a second state signals availability exclusively to the destination device;

a synchronization bit which has a first state to validate the condition signalled by the availability bit;

a stop bit including an alarm condition;

and a termination bit (LST-IND) which in a first state allows continued accessing of the descriptor device by any of said source and destination devices, but in a second state denies continued accessing of the descriptor device to at least a first one of said source and destination devices;

each second descriptor containing:

a data chaining bit;

a memory address;

a branch bit signalling that the memory address indicates the next descriptor; said source and destination device having accessing means for accessing said descriptors and in case of a first descriptor an associated memory section, testing means for testing said availability bit, said stop bit and said termination bit, and setting means, after filling a memory section by the source device, for setting the associated availability bit to the second state and, after vacating a memory section by the destination device, for setting the associated bit the first state, and in that at least a second one of said source and destination devices has further setting means for setting said termination bit to its second state.

2. A data processing system as claimed in claim 1, wherein said descriptor device has at least one third descriptor accessible by only one of said source and destination devices, and being co-connected with said first and second descriptors in said chain, each third descriptor containing:

a data chaining bit;

a memory address;

a non-branch bit signalling that the memory address indicates an associated linked memory section and signalling that the next descriptor is located in the next location of the descriptor device;

a synchronization bit which in a second state signals the unconditional availability of said memory section.

* * * * *